(12) United States Patent
Doyle et al.

(10) Patent No.: US 6,839,700 B2
(45) Date of Patent: Jan. 4, 2005

(54) LOAD BALANCING CONTENT REQUESTS USING DYNAMIC DOCUMENT GENERATION COST INFORMATION

(75) Inventors: Ronald P. Doyle, Raleigh, NC (US); John R. Hind, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 587 days.

(21) Appl. No.: 09/864,609

(22) Filed: May 23, 2001

(65) Prior Publication Data

US 2002/0178259 A1 Nov. 28, 2002

(51) Int. Cl.$^7$ .............................................. G06F 17/30
(52) U.S. Cl. ............................................ 707/2; 707/10
(58) Field of Search ..................... 707/10, 100, 102, 707/200, 203, 2; 370/229; 705/1; 709/105, 201, 203, 224, 230, 241

(56) References Cited

U.S. PATENT DOCUMENTS

| | | | | |
|---|---|---|---|---|
| 6,128,279 | A | * 10/2000 | O'Neil et al. | 370/229 |
| 6,279,001 | B1 | * 8/2001 | DeBettencourt et al. | 707/10 |
| 6,314,463 | B1 | * 11/2001 | Abbott et al. | 709/224 |
| 6,317,786 | B1 | * 11/2001 | Yamane et al. | 709/224 |
| 6,405,252 | B1 | * 6/2002 | Gupta et al. | 709/224 |
| 6,484,143 | B1 | * 11/2002 | Swildens et al. | 705/1 |
| 6,629,127 | B1 | * 9/2003 | Deen et al. | 709/203 |

OTHER PUBLICATIONS

Jia Wang, "A Survey of Web Caching Schemes for the Internet", Oct. 1999, ACM SIGCOMM Computer Communication Review, vol. 29 Issue 5, pp. 36–46.*
Slein et al. "Requirements for Distributed Authoring and Versioning on the World Wide Web", Mar. 1997 ACM, (Standard Vie vol. 5. No. 1, pp. 17–24.*
http://wdvl.internet.com/AUthoring/HTML/Head/Meta/; "WDVL: Html's META–tag", 5 pages.
http://wdvl.internet.com/Authoring/HTML/Head/Meta/HTTP.html; WDVL: HTML's META–tag: HTTP–EQUIV.

* cited by examiner

Primary Examiner—Diane D. Mizrahi
Assistant Examiner—Apu Mofiz
(74) Attorney, Agent, or Firm—Jeanine S. Ray-Yarletts; Jerry W. Herndon; Marcia L. Doubet (57) ABSTRACT

Methods, systems, computer program products, and methods of doing business by performing load balancing of content requests using information regarding the cost of dynamically creating the requested document content. Cost metrics are gathered by a server which generates requested content, and may reflect processing at one or more other servers. This cost information is provided to a load balancing host. Several alternative approaches for providing the cost metrics may be used, including defining new headers for response messages, specifying cookie values, and so forth. The load balancing host may choose to route a subsequent request for that content to the server which most recently generated the content, or to another available server, depending on the cost of re-generating the content and the current load on those servers.

20 Claims, 10 Drawing Sheets

| URL | server |
|---|---|
| http://www.abc.xxx | 1.2.3.4 |
| http://www.def.xxx | 4.3.2.1 |
| http://www.xyz.xxx | 1.1.2.2 |
| http://www.mld.xxx | 3.3.3.3 |

| URL | server |
|---|---|
| http://www.abc.xxx | 1.2.3.4 |
| http://www.def.xxx | 4.3.2.1 |
| http://www.xyz.xxx | 1.1.2.2 |
| http://www.mld.xxx | 3.3.3.3 |

500 Server 1.2.3.4

| URL | cost |
|---|---|
| http://www.abc.xxx | 100 units |
| http://www.def.xxx | 150 units |

520 Server 4.3.2.1

| URL | cost |
|---|---|
| http://www.def.xxx | 130 units |
| http://www.xyz.xxx | 200 units |

540 Server 1.1.2.2

| URL | cost |
|---|---|
| http://www.mld.xxx | 75 units |
| http://www.def.xxx | 200 units |

| |
|---|
| 805  HTTP/1.1 200 OK |
| 810  Content-Type: text/html |
| 815  GenerationCost: 300 |

FIG. 8B

820  <META HTTP-EQUIV="GenerationCost" CONTENT="300" />

FIG. 8C

830  <META NAME="GenerationCost" VALUE="300" />

FIG. 8D

```
<BODY>
  ...
  <! GenerationCost: 300 -- cost of generating this content >
  ...
```
840

FIG. 8E

850  < EDGE:META HTTP-EQUIV="GenerationCost" CONTENT="300" />

FIG. 8F

PROPFIND /apples/chew.jsp HTTP/1.1  ⟵ 860
  Host: www.foo.bar
  Content-type: text/xml; charset="utf-8"
  Content-Length: xxxx <?xml version="1.0" encoding="utf-8" ?>
<D:propfind xmlns:D="DAV:">
  <D:prop xmlns:E="http://www.ibm.com/edgeschema/">
    <E:GenerationCost/>
  </D:prop>
</D:propfind>  ⟵ 865

FIG. 8G

```
HTTP/1.1 200 OK
  Content-Type: text/xml; charset="utf-8"
  Content-Length: xxxx <?xml version="1.0" encoding="utf-8" ?>
<D:multistatus xmlns:D="DAV:">
  <D:response>
      <D:href>http://www.foo.bar/apples/chew.jsp </D:href>
      <D:propstat>
          <D:prop xmlns:E="http://www.ibm.com/edgeschema/">
              <E:GenerationCost>
              <E:host>
                  wa.foo.bar
                      <E:value> 300 </E:value>
              </E:host>
              <E:host>
                  wb.foo.bar
                      <E:value> 275 </E:value>
              </E:host>
              <E:host>
                  wc.foo.bar
                      <E:value> 375 </E:value>
              </E:host>
              </E:GenerationCost>
          </D:prop>
          <D:status>HTTP/1.1 200 OK</D:status>
      </D:propstat>
  </D:response>
</D:multistatus>
```

(The `<E:GenerationCost>` ... `</E:GenerationCost>` block is labeled 870.)

LOAD BALANCING CONTENT REQUESTS USING DYNAMIC DOCUMENT GENERATION COST INFORMATION

BACKGROUND OF THE INVENTION

1. Field of the Invention

The present invention relates to computer networks, and deals more particularly with methods, systems, computer program products, and methods of doing business by performing load balancing of content requests using information regarding the cost of dynamically creating the requested document content.

2. Description of the Related Art

Load balancing solutions are known in the art which use relative server capacity to dynamically select a server to handle each incoming content request. Examples of such load balancing systems include Sysplex Distributor from the International Business Machines Corporation ("IBM"), which is included in IBM's OS/390® Transmission Control Protocol/Internet Protocol ("TCP/IP") implementation, and the Multi-Node Load Balancer ("MNLB") from Cisco Systems, Inc. ("OS/390" is a registered trademark of IBM.) In addition to relative server capacity, Sysplex Distributor also considers network policy information and quality of service considerations in the dynamic selection process.

A component known as Workload Management ("WLM") is used in the OS/390 TCP/IP implementation for obtaining run-time information about the current load on particular servers for which Sysplex Distributor is performing the load balancing process. This information may then be used when selecting the target servers for the incoming client requests.

Figure 1:
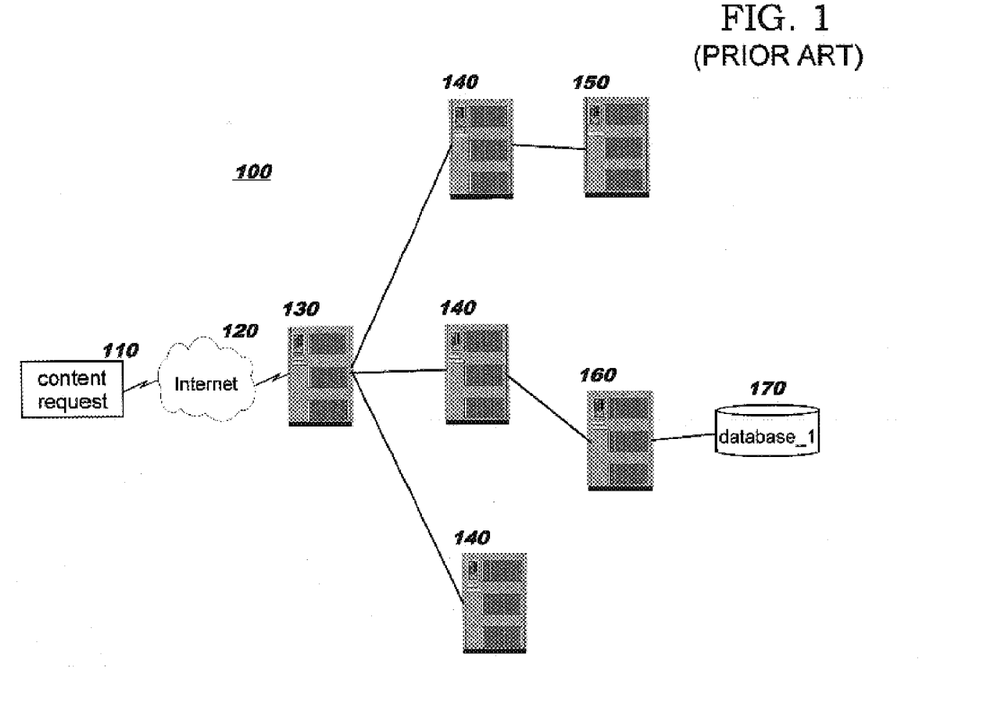
FIG. 1 is a diagram of a server site in which a load balancing server routes incoming content requests, according to the prior art.

FIG. 1 provides a diagram of a representative server site 100 for which load balancing is being performed. The term "server site" as used herein refers to a collection of server nodes that serve Web content associated with a given fully-qualified domain name. For example, the server site 100 in FIG. 1 may (for purposes of example) serve content for a domain name such as "www.ibm.com". In this example, a content request 110 is transmitted from a client (not shown) through a network such as the Internet 120 and then to a load balancing host 130 (that is, a computing device which performs the load balancing process). The load balancing host may then select one of the Web servers 140 (such as Apache, Netscape, or Microsoft servers), according to the load balancing strategy which has been implemented in host 130. To serve the requested content, a particular Web server may invoke the services of an application server (such as an IBM WebSphere® application server), where this application server may be co-located with the Web server 140 in a single hardware box or may be located at a different device 150. The Web server may also or alternatively invoke the services of a back-end enterprise data server 160 (such as IBM OS/390 servers running the DB/2, CICS®, and/or MQI products from IBM), which may in turn access one or more databases 170 or other data repositories. ("WebSphere" and "CICS" are registered trademarks of IBM.)

The load balancing host 130 may also function as a reverse proxy and/or cache server. The IBM Web Sphere Edge Server is one implementation which provides this combined functionality. For example, it may be possible in some cases to serve the requested content from cache which is accessible to host 130, rather than sending the content request on to a Web server 140.

While existing load balancing techniques may be satisfactory from a functional perspective, they may not provide an optimal solution in some situations. Accordingly, what is needed is an improved technique for performing load balancing operations.

SUMMARY OF THE INVENTION

An object of the present invention is to provide improved load balancing techniques.

Another object of the present invention is to provide a load balancing technique which more efficiently routes requests for dynamic content generation.

Yet another object of the present invention is to provide a load balancing technique that considers cost metrics when determining where to route a content request.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for improving load balancing operations using cost metrics. This technique preferably comprises: obtaining cost metrics representing a cost of generating document content; receiving a request for particular document content; and using the obtained cost metrics as a factor when routing the request to a selected one of a plurality of servers. (As an alternative to routing the request, a response may be created using cached content, if available.)

In a preferred embodiment, the technique may further comprise determining a particular one of the plurality of servers which most recently served the requested document content, in which case using the obtained cost metrics preferably further comprises: determining which one of the plurality of servers is (1) capable of serving the requested document content and (2) most lightly loaded; comparing a first cost of routing the request to the determined one to a second cost of routing the request to the particular one; selecting the determined one if the first cost is less than the second cost, and selecting the particular one otherwise. The first cost and the second cost preferably include a current load on the determined one and the particular one, respectively.

Obtaining the cost metrics may further comprise receiving meta-data which conveys that information, wherein using the obtained cost metrics comprises using the cost metrics from the received meta-data. The meta-data may comprise one or more cookies, a HyperText Transfer Protocol ("HTTP") response header or a plurality of HTTP response headers (each conveying an element of the cost metric for a particular document content), or syntax in a markup language. In this latter case, the markup language may be, for example, HTML ("HyperText Markup Language") or XML ("Extensible Markup Language"). When using HTML, options for the syntax include: (1) a "META" tag using an "HTTP-EQUIV" attribute syntax; (2) a "META" tag using a "NAME" attribute syntax; and (3) a specially-denoted comment.

In one aspect, obtaining the cost metrics further comprises querying remotely-stored cost metric information. A "WebDAV" request may be used for this query. Optionally, a response to the WebDAV request may specify cost metrics for more than one of the plurality of servers (e.g. for multiple servers which are capable of generating the associated content).

In an alternative embodiment, the technique may further comprise: determining a particular one of the plurality servers which most recently served the requested document content; a current workload on the particular one; determining the other ones of the plurality of servers which are capable of serving the requested document content; determining the current workload on each of the determined other ones; and determining a lesser of the current workloads on each of the determined other ones. In this case, using the obtained cost metrics preferably further comprises: comparing a first cost of routing the request to the determined one, given its determined current workload, to a second cost of routing the request to the server which has the determined lesser of the current workloads, given that lesser current workload; and selecting the determined one if the first cost is less than the second cost and selecting the server which has the determined lesser of the current workloads otherwise.

In another embodiment, the technique comprises gathering cost metric information representing a cost of generating document content, and creating meta-data to convey the cost metric information to a load balancer. This embodiment may further comprise sending the created meta-data to the load balancer, and the gathered cost metric information may comprise one or more of: (1) processing time at an origin server; (2) network costs from the origin server to one or more backend enterprise servers; (3) processing time at the backend enterprise servers; and (4) a cost of delivering the generated document content to a proxy or cache.

The present invention may also be used advantageously in methods of doing business, for example by providing more efficient load balancing in Web hosting sites (which may then offer their customers the advantage of reduced end-to-end costs for the customer site).

The present invention will now be described with reference to the following drawings, in which like reference numbers denote the same element throughout.

DESCRIPTION OF PREFERRED EMBODIMENTS

The present invention defines techniques for improving load balancing operations by utilizing information about the cost of dynamic content generation in the content request routing decision process which occurs at the edge of the network or at the front end of a server farm. The term "cost metrics" is used herein to refer to this information about the cost of content generation. By way of example, the generated content may comprise a Web page or other Web document. The improved technique of the present invention may operate within a network configuration such as the sample network shown in FIG. 1, where the load balancing host 130 is modified to use an improved load balancing algorithm as will be described herein, and where the servers 140, 150, and/or 160 which serve dynamically-generated content are modified to provide cost metrics about the generation process.

Commonly-assigned U.S. Pat. 2002/0099807 (Ser. No.09/767,237, filed Jan. 22,2001), which is entitled "Cache Management Method and System for Storing Dynamic Contents" discussed obtaining cost metrics from servers that represent the costs associated with generating dynamic content, and using these cost metrics to improve cache replacement algorithms. However, the techniques disclosed therein do not teach use of generation cost metrics for purposes of load balancing.

Various types of information may be included by a server when computing cost metrics. As one example, the processing time on an application server which generates the requested content is preferably included in the cost metric. As another example, dynamically generated content may reflect the result of extracting information from a backend data store (for example, by issuing complex queries against a database, by invoking a legacy host application, etc.). The Host Publisher software product available from IBM is an example of software that may be invoked in response to receiving a user request for Web content, where that content requires invoking a legacy host application or accessing a relational database. The data extracted using the legacy application may then be used to populate the properties of a Java™ bean, which can subsequently be used to dynamically generate HyperText Markup Language ("HTML") syntax using JavaServer Pages™ ("JSP™") technology. The generated HTML page may then be transmitted to a user's computer, where it will typically be rendered with a user agent such as a browser. Or, the populated bean may be accessed from a standalone application (e.g. using an Enterprise JavaBean™, or "EJB™". ("Java", "JavaServer Pages", "JSP", "Enterprise JavaBean", and "EJB" are trademarks of Sun Microsystems, Inc.) Generation of dynamic content in this manner involves a significant amount of processing overhead. Processing the user's content request involves making a connection to the legacy host system, completing a log-on process, navigating among various host screens to extract the pertinent information, and logging off. Preferably, these processes are accounted for in the cost metric which will be associated with the generated content according to the teachings of the present invention. Similarly, generating content using complex database queries or other legacy data sources is also an expensive, high-overhead process, and the costs thereof are preferably included in the content generation metrics.

The generation cost preferably includes processing time at the origin server, network costs from the origin server to zero or more other enterprise servers in the backend data center (e.g. When EJB processing is used), and the processing time at those enterprise servers, including but not limited to a cost which represents disk access, CPU cycles (for content generation as well as database queries and so forth), and backend network costs. In addition, the cost of delivering generated content to a proxy, including intermediate network caching locations, may be included. (Note that use of network round-trip times as a factor in load balancing decisions is believed to be known in the art. However, no techniques which use cost metrics of the type disclosed herein, and in the manner disclosed herein, are known to the present inventors.)

The value of the cost metric may be obtained in several ways. In one approach, each server that operates on a content request may report information about its expended efforts. In another approach, an overall elapsed time may be measured. This measurement may be made by the target server to which a content generation request is routed by the load balancing host. In this latter case, the cost metric may be determined by measuring the time interval from receiving a content request at a selected server to completion of the generation process. Or, the cost metric may also include a measure of the total round-trip time between the load balancing host and the selected server, such that the metric represents the total time elapsed after routing the content request from the load balancing host until receiving the generated content (or the server's report of its portion of the cost metric) at the load balancing host. The types of information to be included in cost metrics, and the manner in which these metrics are captured and/or reported, may vary from one implementation to another without deviating from the scope of the present invention.

Figure 2:
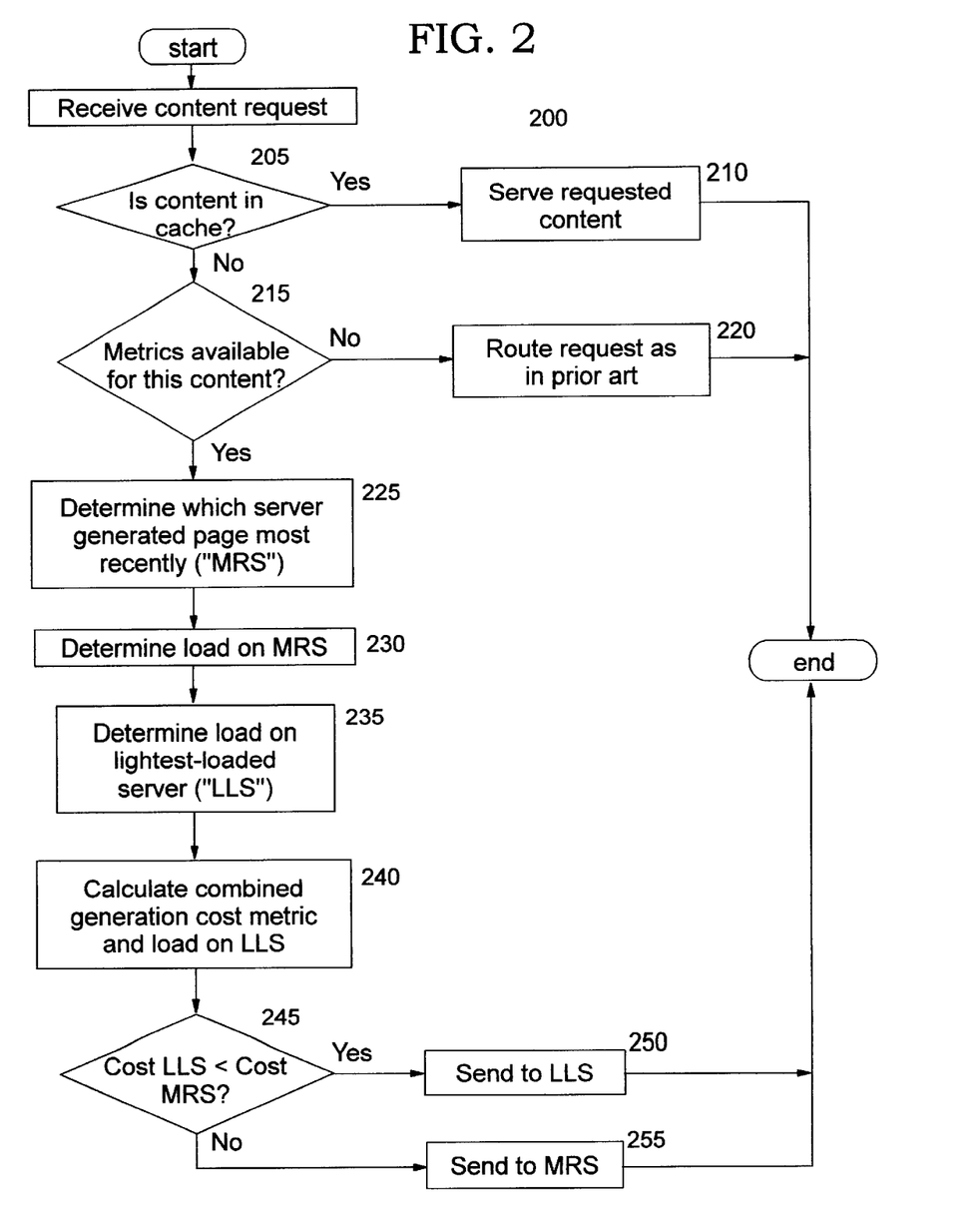
FIG. 2 provides a flowchart depicting logic with which preferred embodiments of the present invention may be implemented.

Referring now to FIG. 2, logic which may be used to implement preferred embodiments of the improved load balancing process of the present invention will now be described. The logic of FIG. 2 represents processing that occurs for a particular incoming content request, and begins at Block 200 by receiving the content request. The test in Block 205 determines whether the requested content is available in cache. If so, then that content may be served from cache (Block 210) as in the prior art. The processing of FIG. 2 then ends for this request.

Figure 3:
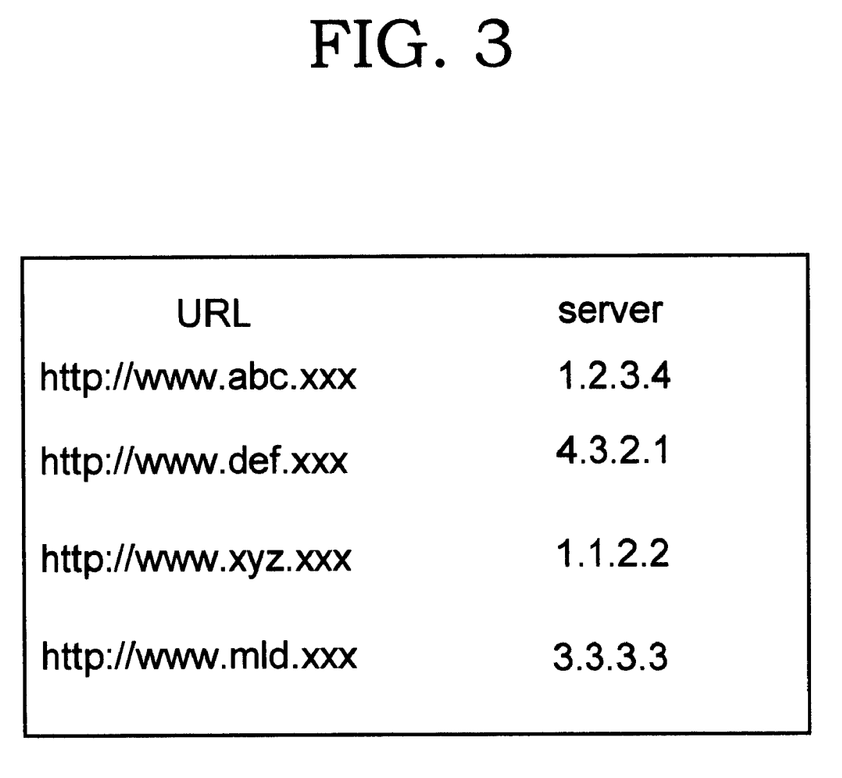
FIG. 3 illustrates a data structure that may be used to remember which server has most recently served a particular content request.

When the test in Block 205 has a negative result, the test in Block 215 checks to see if any cost metrics are available for the requested content. If not, then the request is routed as in the prior art (Block 220), and the processing of FIG. 2 ends. Otherwise, processing continues at Block 225 where a determination is preferably made as to which server most recently generated this content. A preference will be given to routing the current request to that server, according to preferred embodiments, because it may happen that some elements used when the content was previously generated may still be available for retrieval (rather than re-generation) at that server. FIG. 3 illustrates a simple data structure 300 which may be used by block 225, wherein identifying information (such as a Uniform Resource Locator, or "URL") for the content is stored alog with an identification of the most recent server (such as the IP address thereof) to generate that content. Block 230 then dertermines the load on this most recent server ("MRS"), e.g. using the Worckload Management function which was previously discussed (or a similar function). Note that an entry for the recuested content should exist in the data structure represented by FIG. 3; otherwise, the branch to Block 220 would have been taken.

Block 235 then determines the lightest-loaded server ("LLS") available to this load balancing host. Block 240 computes the cost of sending the content generation request to this lightest-loaded server, using the cost metric associated with the content. (This cost metric may be stored in the same data structure represented by FIG. 3, if desired, or may be separately stored.) The test in Block 245 determines whether this computed cost indicates that sending the content request to the LLS is less than sending it to the MRS, given the current load on the LLS as well as on the MRS. If so, then the request is sent to the LLS (Block 250); otherwise, it is sent to the MRS (Block 255). In either case, the routing process is then complete and the processing of FIG. 2 ends.

In this manner, the present invention determines whether the server which would receive the content request (i.e. the MRS) is heavily loaded as compared to other servers, and routes it to one of the other servers (i.e. the LLS) if the cost of generating the page is smaller than the server load mismatch. This allows the load balancing process to take an end-to-end view of the overall performance of all servers, so as to make an intelligent decision on when to send the content request to the same server and when to choose another server.

Figure 4:
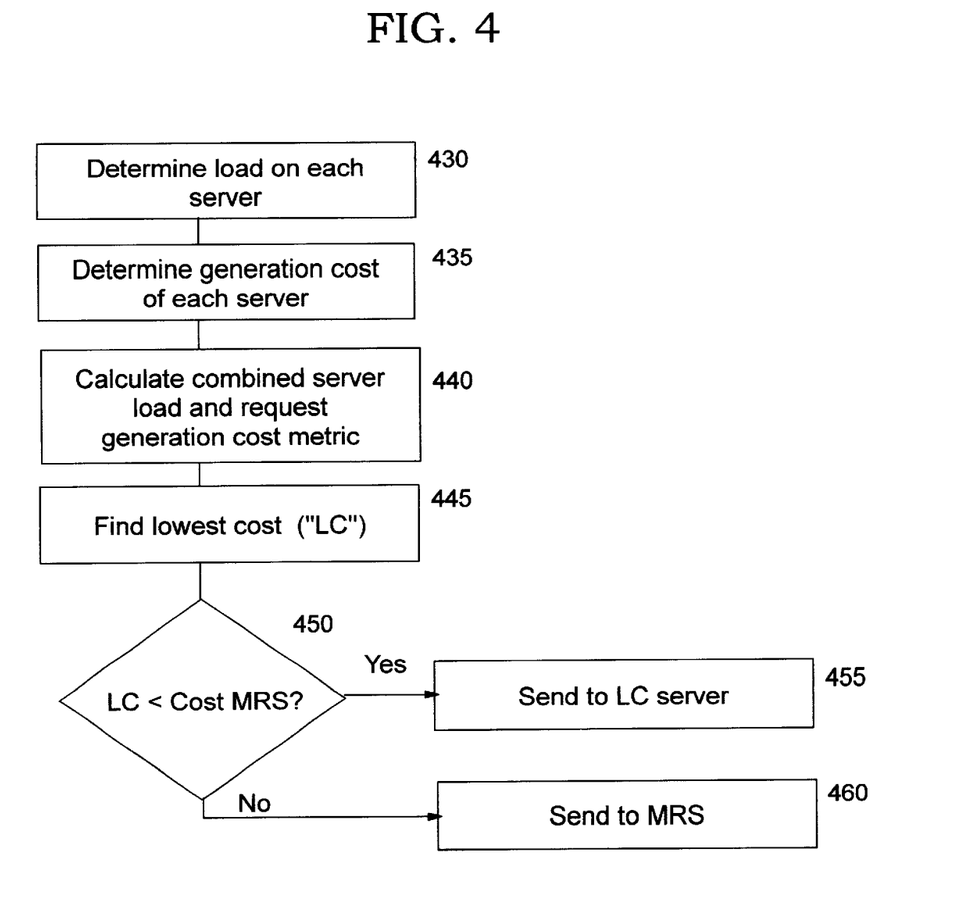
FIG. 4 provides a flowchart depicting logic that may be substituted for portions of the logic in FIG. 2 in alternative embodiments of the present invention.
Figure 5:
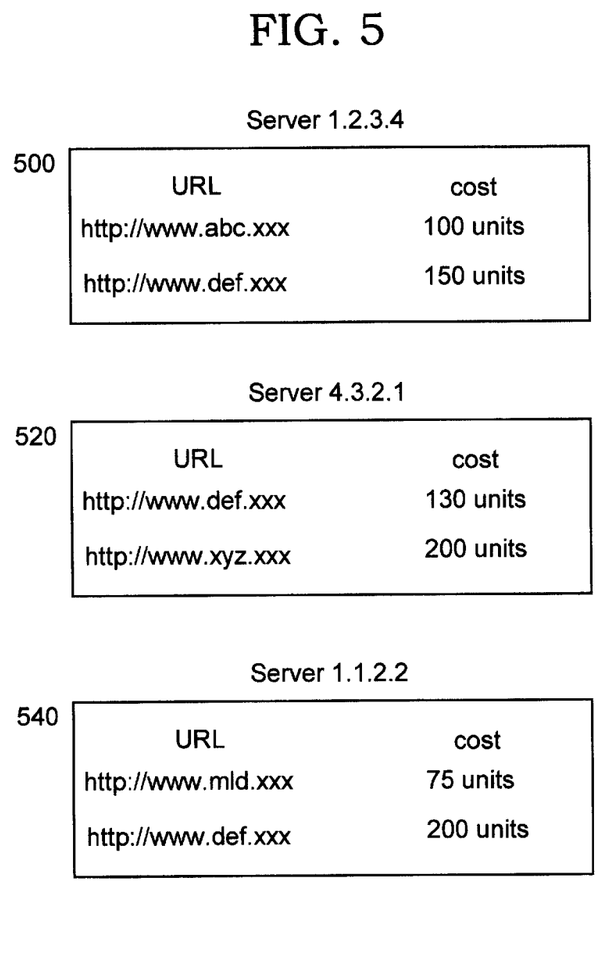
FIG. 5 illustrates data structures that may be used to remember per-server cost metrics for serving particular content requests.

It may happen that some servers are able to more efficiently generate particular content as compared to other servers which are also capable of generating that content. FIG. 4 depicts logic which may be used in alternative embodiments to account for this situation. This logic may be substituted for the logic which begins at Block 230 of FIG. 2. In Block 430, the load on each server is determined. (Alternatively, the load on only those servers which are capable of generating the requested page may be determined. The load balancing host typically maintains information about which servers are capable of serving which content requests, according to the prior art. This information may be used to optimize operation of Block 430.) Block 435 then determines the generation cost at each of these servers. A data structure such as that shown in FIG. 5 may be used for this purpose. FIG. 5 illustrates use of a table 500, 520, 540 (or similar structure) for each server, where that table stores information about the server's cost for generating particular content. If a particular server has not previously generated the requested content, then the cost metric for that server may be set to a high value (such as 999999) during the processing of Block 435; alternatively, a default or average cost (e.g. the average cost of this content on all other servers, or the average cost of other content generated by this particular server) may be used. (A high value may also be used if a particular server is not capable of generating the requested content, in the case where this server was not previously omitted during the processing of Block 430.)

Block 440 then computes the cost of sending the request to each of the servers, using the cost associated with generating the content at each server as well as the load on that server. Block 445 finds the lowest cost ("LC") of these computed values. The test in Block 450 determines whether this computed cost LC is less than sending the content request to the MRS, given the current load on the server associated with LC as well the load on the MRS. If so, then the request is sent to the server associated with LC (Block 455); otherwise, it is sent to the MRS (Block 460). In either case, the routing process is then complete and the processing of FIG. 4 ends.

Figure 6:
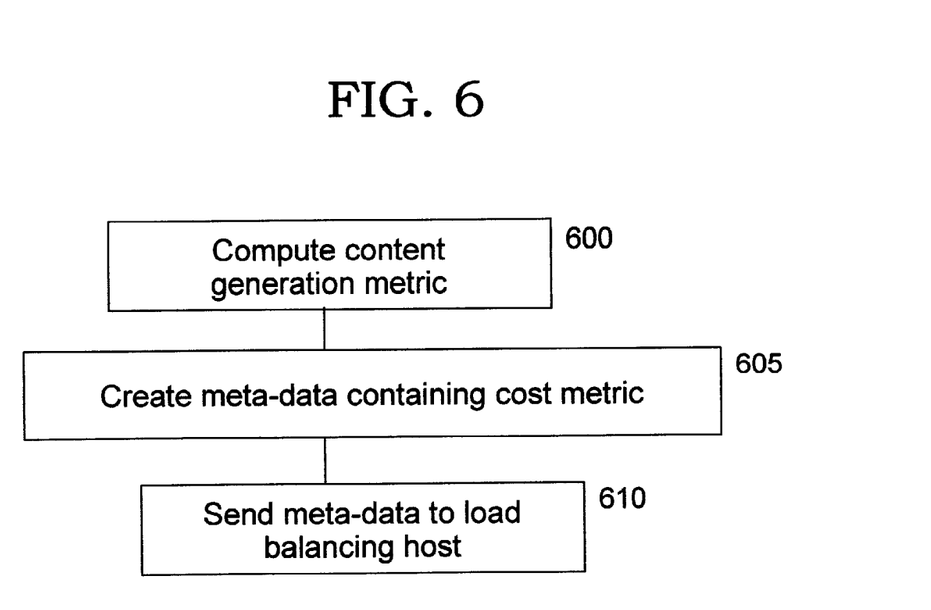
FIG. 6 provides a flowchart depicting logic with which cost metrics may be made known to a load balancing host, according to preferred embodiments of the present invention.

FIG. 6 depicts logic which may be used to implement code for sending cost metric information to the load balancing host. As shown in Block 600, the content generation cost metric is computed. Various factors may be included in this computation, as discussed above. Meta-data is preferably created to convey this information (Block 605). This meta-data is described in more detail below with reference to FIG. 8. The meta-data is then sent to the load balancing host (Block 610). In situations where the generated content is being routed back through the load balancing host (e.g. When it also serves as a cache), the meta-data is preferably specified within the response. Otherwise, if the content is routed directly to the requesting client, then a separate message may be sent to the load balancing host to convey the cost metric.

Figure 7:
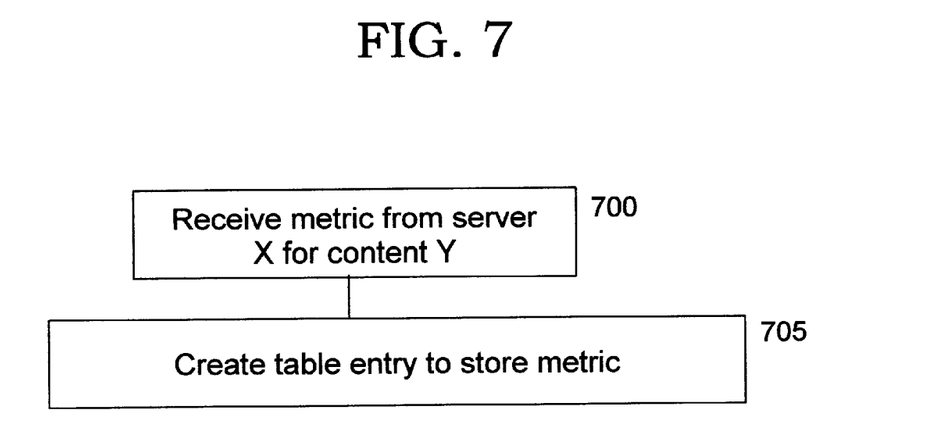
FIG. 7 provides a flowchart depicting logic with which a load balancing host may process incoming cost metrics, according to preferred embodiments of the present invention.

FIG. 7 depicts logic with which a load balancing host may process incoming cost metric information. At Block 700, the information from a particular server for a particular content request, shown in the figure as content "Y" from server "IXC", is received. A data structure is then updated (Block 705) to store this information. In the embodiments represented by the load balancing process of FIG. 2, the data structure 300 in FIG. 3 is preferably revised to indicate server X as the most recent server for generating content Y, and the associated generation cost is either stored within this same data structure or stored separately. In the embodiments represented by the load balancing process of FIG. 4, the data structure for server X is located, and an entry therein for content Y is created if not already present, or revised if present, to store the cost metric from the meta-data. (Note that it may be desirable to override the previously-stored metric in some implementations, while other implementations may choose to compute an average between the received cost metric and a previously-stored metric.)

Figure 8A:
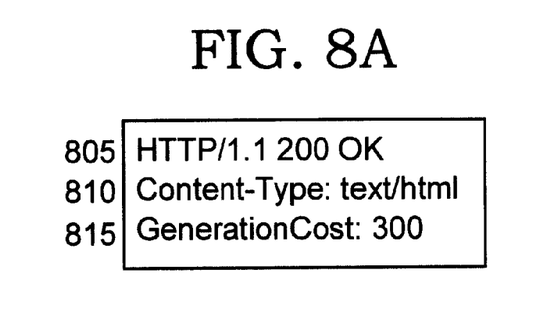
FIGS. 8A through 8G depict several representative examples of syntax that may be used to convey cost metrics to a load balancing host, according to preferred embodiments of the present invention.
Figure 8B:
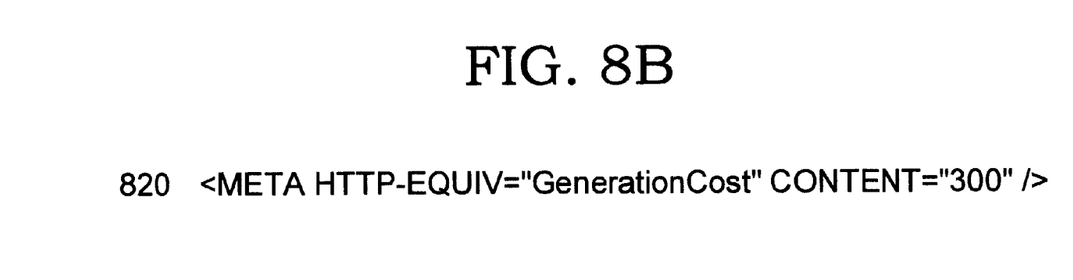

FIGS. 8A through 8G illustrate several different syntax formats that may be used for conveying meta-data within response messages. These examples illustrate syntax for use within a response header; other approaches may be used alternatively, including but not limited to conveying the information within one or more cookies of the response header rather than as separate headers. FIG. 8A illustrates an example using HyperText Transfer Protocol ("HTTP") syntax. The examples in FIG. 8B through 8D) represent three formats that may be used in HTML syntax. The example in FIG. 8E uses the Extensible Markup Language ("CML").

Figure 8C:
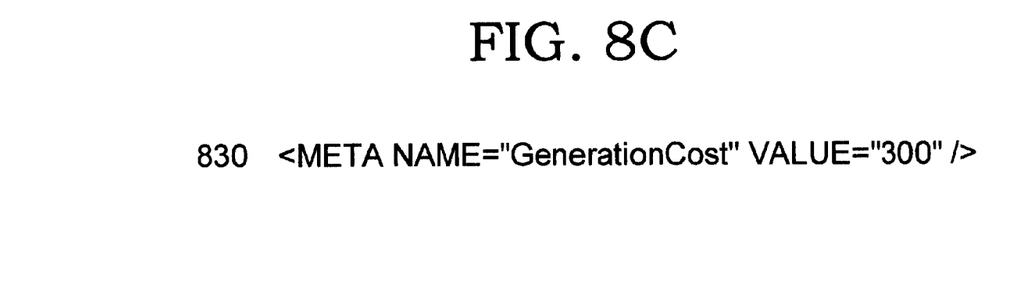
Figure 8D:
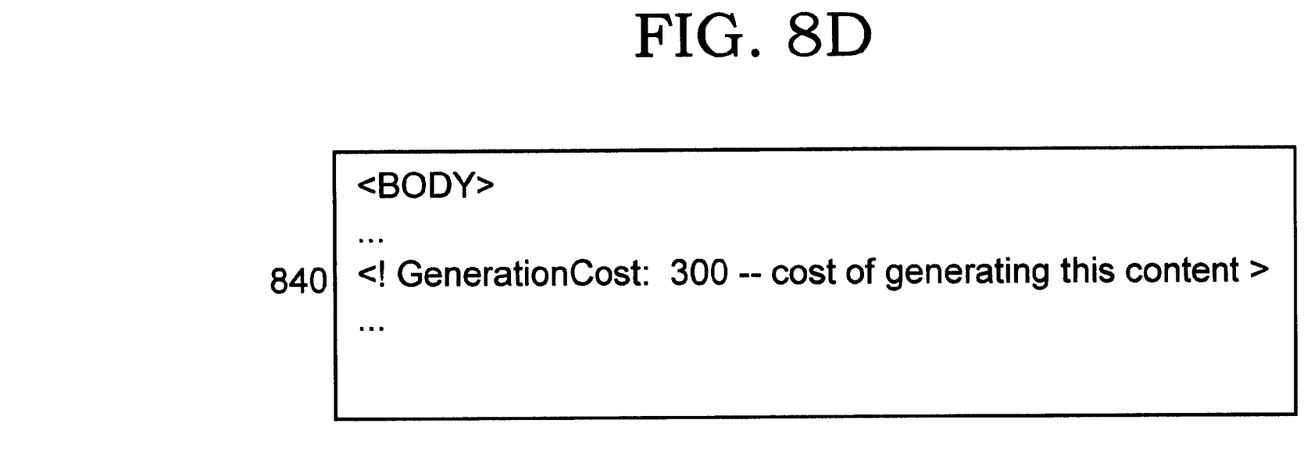
Figure 8E:
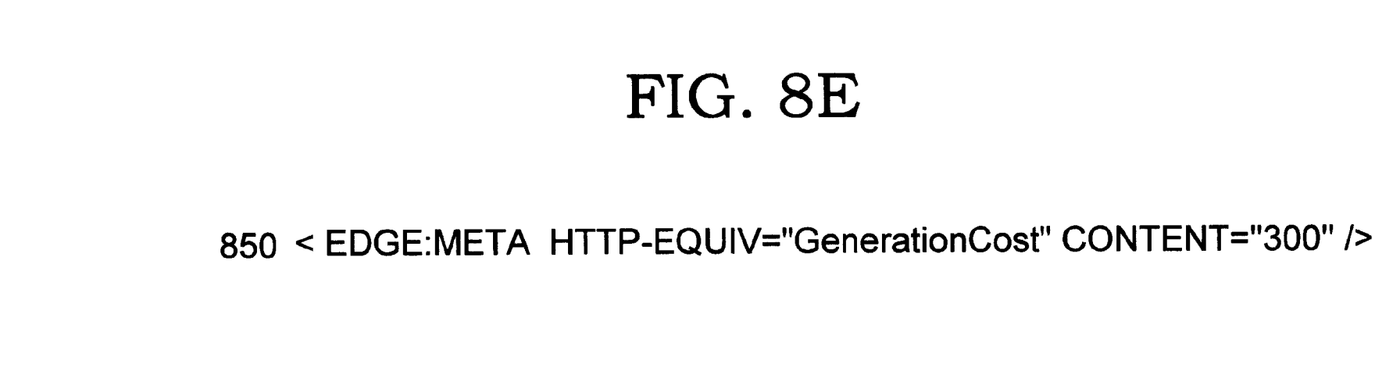
Figure 8F:
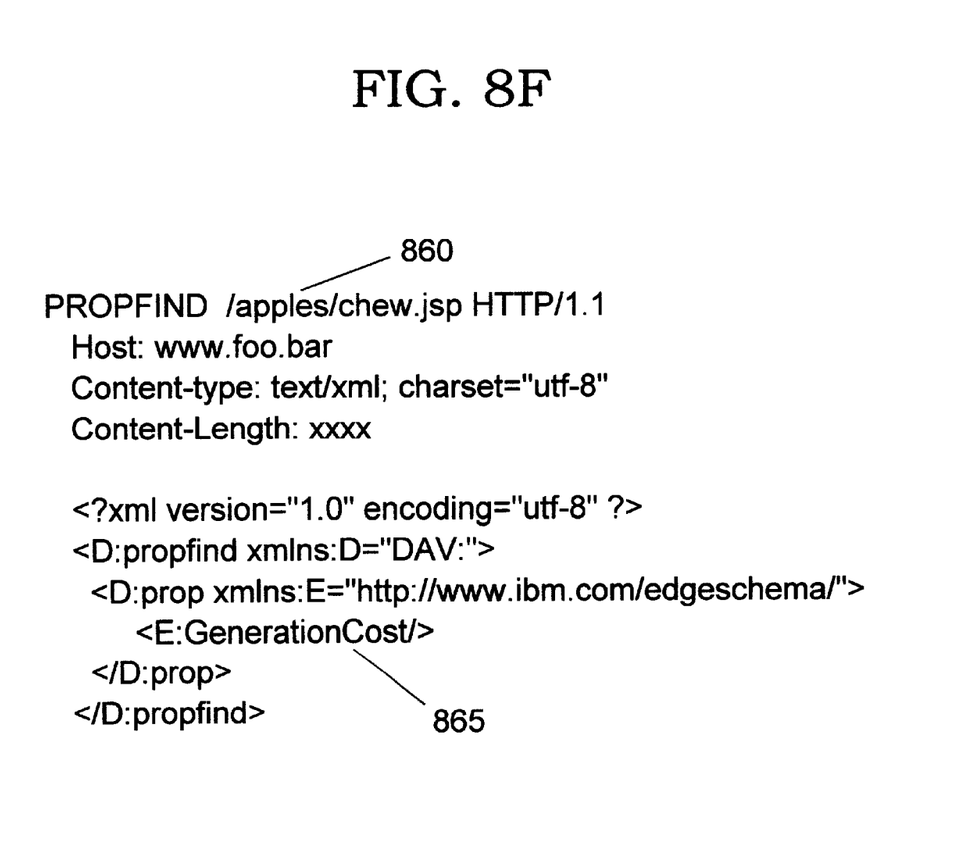
Figure 8G:
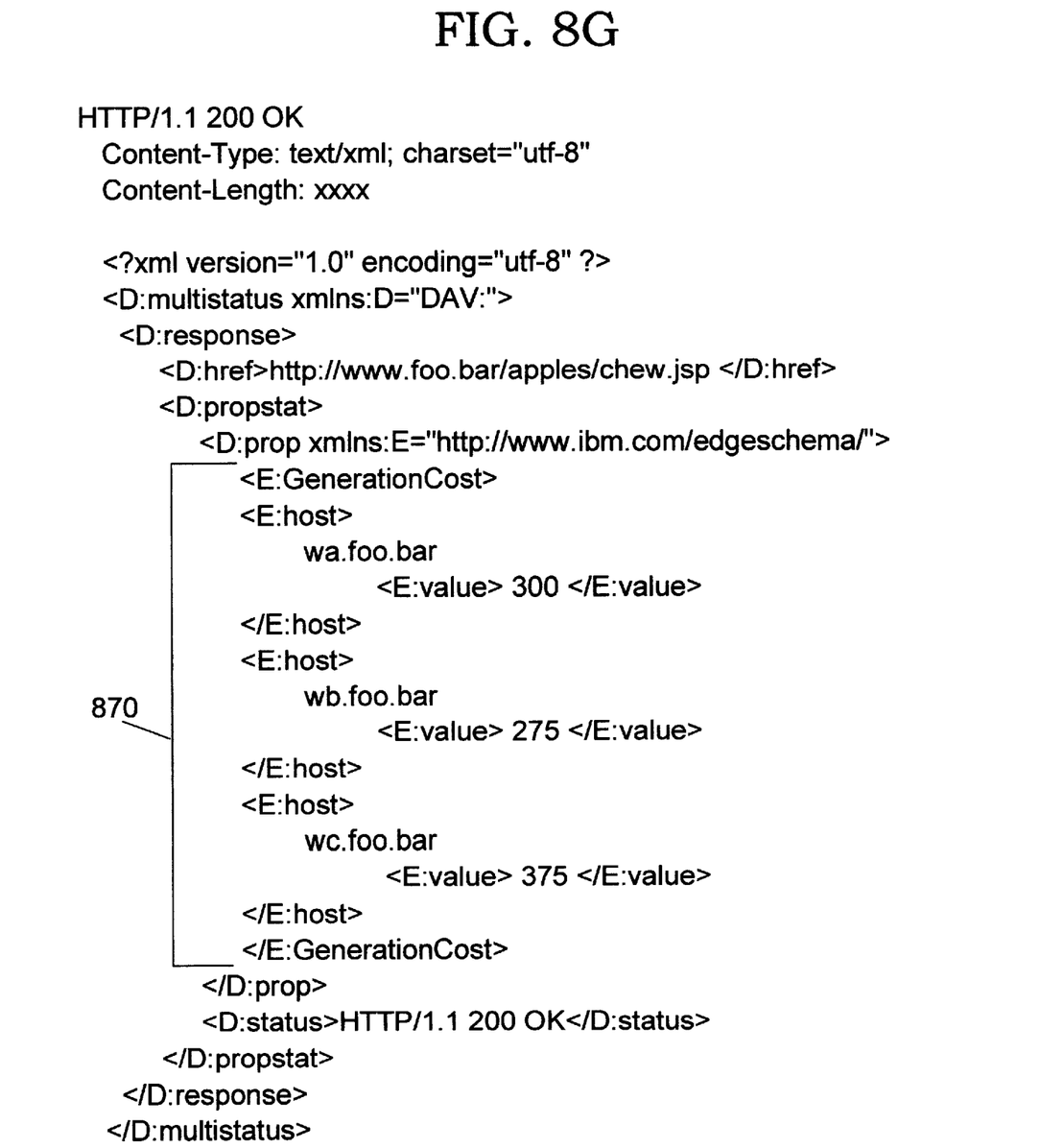

FIGS. 8F and 8G illustrate an example of obtaining generation cost meta-data on request by issuing a WebDAV query and receiving a response thereto. These examples will now be discussed in mere detail.

Use of the HTTP header syntax, as illustrated in FIG. 8A, enables cost metrics for any type of content object to be transmitted using a single metric syntax. Assuming that an HTTP GET request such as "GET http://www.abc.xxx/doc.servlet HTTP/1.1" is received at the load balancing host, the response header shown in FIG. 8A indicates the following information: (1) the status is "OK" (see element 805); (2) this is a response message (see element 810); and (3) the generation cost of this response was, for this example, 300 units (see element 815). The "GenerationCost" header shown at 815 is an example of the header syntax that the content servers generate, and that the load balancing host searches for in metric information created by those servers, according to the present invention. Alternatively, other names for this header might be used, or individual headers might be used to separately convey factors which together comprise the overall cost (such as a header for the disk access, a header for the CPU time, and so forth). In this latter case, the load balancing host may store these values separately, or might sum them and store the result.

Markups in other markup language objects, such as HTML and XML, may be used as alternatives to the format shown in FIG. 8A. For HTML, one example of an alternative format uses the "HTTP-EQUIV" attribute on a "META" tag, as shown at 820 in FIG. 8B. In this example, the syntax "GenerationCost" has been used as the name of the cost metric, as in FIG. 8A. A META element may be used to identify properties of a document. An HTTP-EQUIV attribute on a META tag may be used in markup language documents to explicitly specify equivalent information that an HTTP server should convey in the HTTP response message with which the document is transmitted. Information on this tag can be found in Request For Comments ("RFC") 2518 from the Internet Engineering Task Force, which is entitled "HTTP Extensions for Distributed Authoring—WEBDAV" (February 1999), as well as on the Internet at location http://wdvl.com/Authoring/HTML/Head/Meta/HTTP.html. Location www.webdav.org on the Internet also provides general information about the initiative for extending the HTTP protocol to include distributed authoring and versioning syntax. Use of WebDAV requests enables accessing the meta-data property information remotely, such that the load balancing host may query the cost metric information stored at the generating server, as an alternative to using the server push technique illustrated by FIGS. 6 and 7. (Refer to the discussion of FIGS. 8F and 8G, below, for examples of using WebDAV for obtaining cost metric information.)

Another example of an alternative format for use with HTML document uses the META tag with a "NAME" attribute, rather than an HTTP-EQUIV attribute. This alternative is illustrated in FIG. 8C at element 830. The NAME attribute on a META element identifies a property name, and the VALUE attribute then specifies a value for that named property. For more information on use of the NAME attribute, refer to RFC 2518 or to http://wdvl.com/Authoring/HTML/Head/Meta on the Internet.

A third example of an alternative format for use with HTML documents uses specially-denoted comments within the body of a content response, as illustrated at 840 in FIG. 8D.

With XML documents, a namespace is preferably used to introduce a tag set for conveying cost metrics, and may be designed to resemble the HTML markup if desired. An example of this approach is shown at 850 in FIG. 8E, where a tag value "EDGE" denotes this document element as corresponding to the tag set which has been defined to include the META, HTTP-EQUIV, and CONTENT keywords.

Referring now to FIGS. 8F and 8G, an example is illustrated of obtaining generation cost meta-data on request by issuing a WebDAV query and receiving a response thereto. When using WebDAV, it is likely that the hosting servers, such as Web server 140 in FIG. 1, which share a URL namespace are able to share meta-data properties about the namespace (for example, by way of a content manager). The cost property for a given document might then be multi-valued, wherein a given one of the values represents the cost on one of the hosting servers for that document in the URL namespace. In this case, a single WebDAV request might retrieve cost metrics for all of the servers capable of serving the content. The example query in FIG. 8F requests stored information that uses the "GenerationCost" property name (see element 865) associated with the content "apples/chew.jsp" (see element 860). The response message illustrated in FIG. 8G shows that values for this property are being provided from three Web servers "wa.foo.bar", "wb.foo.bar", and "wc.fco.bet" (see element 870), where these three Web servers may correspond to the servers 140 shown in FIG. 1. As shown in the example, the first of these servers can provide the requested content with a generation cost value of 300 units; the second with a generation cost value of 275 units, end the third with a generation cost value of 375 units.

As has been demonstrated, the present invention provides advantageous techniques for improving load balancing operations for dynamic content, providing an optimized approach that considers the end-to-end picture of servers available for serving the content and their current processing load.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

What is claimed is:

1. A method of improving load balancing operations in a computing network using cost metrics, comprising steps of:

obtaining cost metrics representing a cost of generating document content;

receiving a request for particular document content;

determining a particular one of a plurality servers which most recently served the requested document content; and routing the request to a selected one of the plurality of servers, further comprising the steps of:

determining which other one of the plurality of servers is (1) capable of serving the requested document content and (2) most laghtly loaded;

using the obtained cost metrics to compare a first cost of routing the request to the determined one to a second cost of routine the request to the particular one; and selecting the determined one if the first cost is less than the second cost and selecting the particular one otherwise.

2. The method according to claim 1, wherein the first cost and the second cost include a current load on the determined one and the particular one, respectively.

3. The method according to claim 1, wherein:

the obtaining step further comprises the step of receiving meta-data which conveys the cost metrics for the document content; and the using step further comprises the step of using the cost metrics from the received meta-data.

4. The method according to claim 3, wherein the received meta-data comprises one or more cookies.

5. The method according to claim 3, wherein the received meta-data comprises a HyperText Transfer Protocol ("HITTP") response header.

6. The method according to claim 3, wherein the received meta-data comprises a plurality of HyperText Transfer Protocol ("HTTP") response headers, each of the headers conveying an element of the cost metric for a particular document content.

7. The method according to claim 3, wherein the received meta-data comprises syntax in a markup language.

8. The method according to claim 7, wherein the markup language is HTML ("HyperText Markup Language").

9. The method according to claim 8, wherein the syntax comprises a "META" tag using an "HTTP-EQUIV" attribute syntax.

10. The method according to claim 8, wherein the syntax comprises a "META" tag using a "NAME" attribute syntax.

11. The method according to claim 8, wherein the syntax comprises a specially denoted comment.

12. The method according to claim 1, wherein the markup language is XML ("Extensible Markup Language").

13. The method according to claim 1, wherein the obtaining step further comprises querying remotely-stored cost metric information.

14. The method according to claim 13, wherein the querying step uses a WebDAV request.

15. The method according to claim 14, wherein a response to the WebDAV request specifies cost metrics for more than one of the plurality of servers.

16. The method according to claim 1, wherein, the second cost includes a current workload on the particular one.

17. A system for improving load balancing operations in a computing network using cost metrics, comprising:

means for obtaining cost metrics representing a cost of generating document content;

means for receiving a request for particular document content;

means for responding to the request using cached content, if available; and means for routing the request to a selected one of a plurality of server; when cached content is not available, further comprising:

means for determinig a particular one of the plurality of servers that most recently served the requested document content;

means for determinig which other one of the plurality of servers is (1) capable of serving the requested document content and (2) most lightly loaded;

means for using the obtained cost metrics to compare a first cost of routing the request to the determined one to a second cost of routing the request to the particular one and means for selecting the determined one if the first cost is less than the second cost and selecting the particular one otherwise.

18. A computer program product for improving load balancing operations in a computing network using cost metrics, the computer program product embodied on one or more computer-readable media and comprising:

computer-readable program code means for obtaining cost metrics representing a cost of generating document content;

computer-readable program code means for receiving a request for particular document content;

computer-readable program code means for responding to the request using cached content, if available; and computer-readable program code means for routing the request to a selected one of a plurality of servers, when cached content is not available, further comprising:

computer-readable program code means for determining a particular one of the plurality of servers that most recently served the requested document content;

computer-readable program code means for determining which other one of the plurality of servers is (1) capable of serving the requested document content and (2) most lightly loaded;

computer-readable program code means for using the obtained cost metrics to compare a first cost of routing the request to the determined one to a second cost of routing the request to the particular one; and computer-readable program code means for selecting the determined one if the first cost is less than the second cost and selecting the particular one otherwise.

19. A method of using cost metrics when load balancing incoming content requests in a networking environment, comprising steps of:

gathering cost metric information representing a cost of generating document content; and creating meta-data to convey the cost metric information to a load balancer;

sending the created meta-data to the load balancer;

receiving the sent cost metric information at the load balancer;

upon receiving a request for the document content at the load balancer, using the received cost metric information to route the request to a server selected from a plurality of servers, further compromising the steps of:

using the received cost metric information to determine a first cost of serving the requested document content from a particular one of the plurality of servers that most recently served the requested document content;

using the received cost metric information to determine a second cost of serving the requested document content from a different one of the plurality of servers, wherein the received cost metric information indicates that the different one of the plurality of servers which is capable of serving the request document content at least cost; and selecting the particular one if the first cost is less than the second cost and selecting the different one otherwise.

20. The method according to claim 19, wherein the gathered cost metric information comprises at least one of: (1) processing time at one of the plurality of servers which is an origin server; (2) network costs from the origin server to one or more ones of the plurality of servers which are backend enterprise servers; (3) processing time at the backend enterprise servers; and (4) a cost of delivering the generated document content to a proxy or cache.

* * * * *